United States Patent
Lavin et al.

(10) Patent No.: US 10,790,580 B2
(45) Date of Patent: Sep. 29, 2020

(54) EMBEDDED STRUCTURAL ANTENNAS

(71) Applicant: The Boeing Company, Chicago, IL (US)

(72) Inventors: Ronald O'Neil Lavin, Gilbert, AZ (US); Dennis Kent McCarthy, Media, PA (US)

(73) Assignee: The Boeing Company, Chicago, IL (US)

( * ) Notice: Subject to any disclaimer, the term of this patent is extended or adjusted under 35 U.S.C. 154(b) by 315 days.

(21) Appl. No.: 15/845,712

(22) Filed: Dec. 18, 2017

(65) Prior Publication Data

US 2019/0190131 A1  Jun. 20, 2019

(51) Int. Cl.
*H01Q 1/28* (2006.01)
*H01Q 1/40* (2006.01)

(52) U.S. Cl.
CPC .............. *H01Q 1/287* (2013.01); *H01Q 1/40* (2013.01)

(58) Field of Classification Search
CPC .......... H01Q 1/28; H01Q 1/281; H01Q 1/282; H01Q 1/283; H01Q 1/286; H01Q 1/287; H01Q 1/40; H01Q 1/405; H01Q 1/52; H01Q 21/22; B32B 15/08; B32B 27/20; B32B 2262/106; B32B 2457/00; B32B 2605/18

See application file for complete search history.

(56) References Cited

U.S. PATENT DOCUMENTS

| | | | |
|---|---|---|---|
| 2007/0030205 A1* | 2/2007 | Farrell | ............... B64D 43/00 343/703 |
| 2017/0301980 A1* | 10/2017 | Lavin | ................ H01Q 1/42 |
| 2017/0309996 A1* | 10/2017 | Seghi | ................ H01Q 1/42 |

FOREIGN PATENT DOCUMENTS

EP  3085617 A1  10/2016

* cited by examiner

*Primary Examiner* — Robert Karacsony
(74) *Attorney, Agent, or Firm* — Duft & Bornsen, PC

(57) ABSTRACT

The embodiments described herein provide for composite panels that include elements that form one or more Radio Frequency (RF) antennas. The composite panels may be integrated along with other composite panels to form a composite structure for a vehicle. In some cases, the composite panels function both as elements of an RF antenna and as structural elements of the vehicle. In some cases, the composite panels function both as elements of an RF antenna and as a means for static charge dissipation. When operating as an RF antenna, the composite panels are inherently conformal with an outside surface of a composite structure.

24 Claims, 7 Drawing Sheets

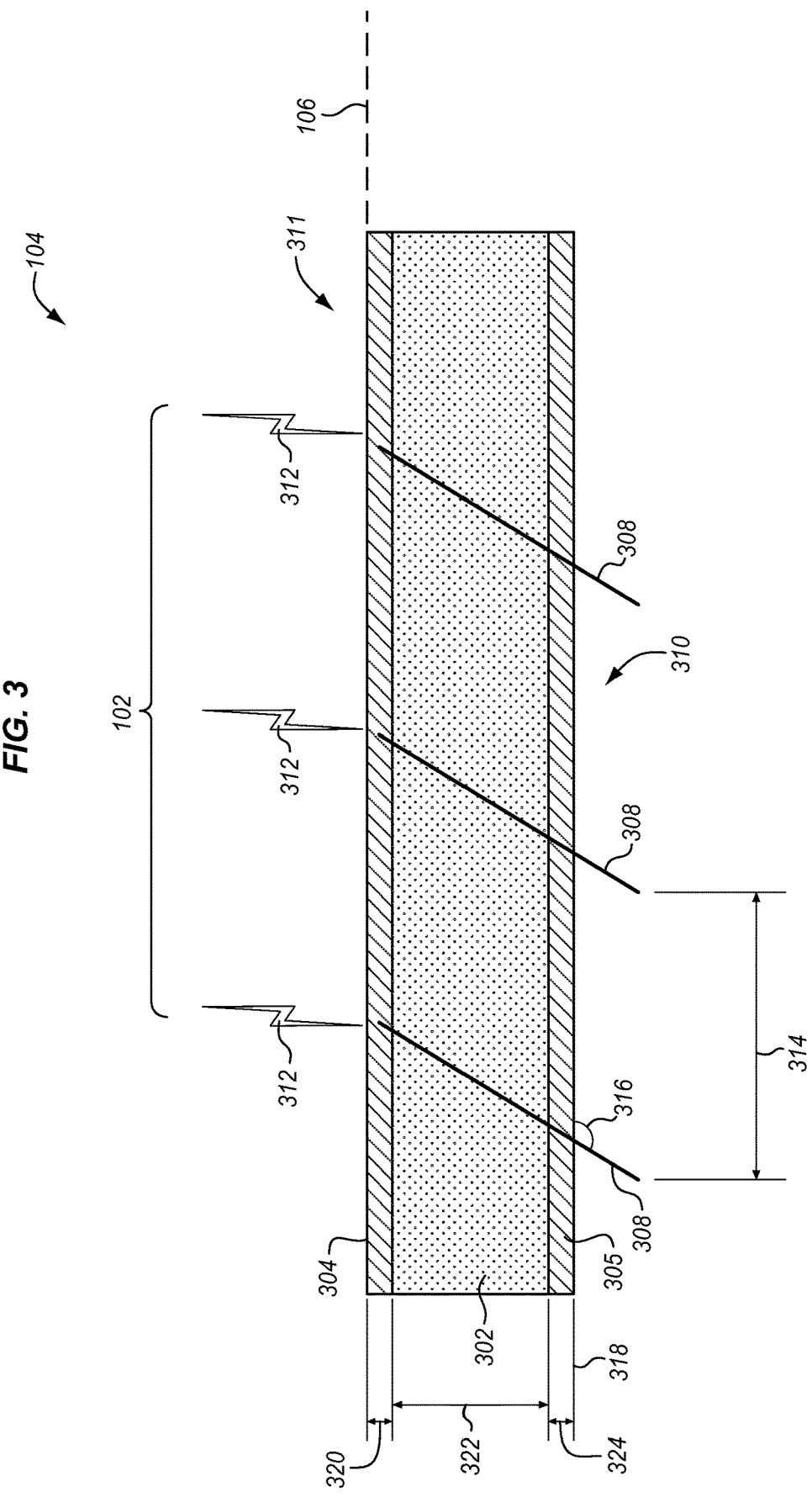

EMBEDDED STRUCTURAL ANTENNAS

FIELD

This disclosure relates to the field of antennas, such as antennas that might be used on aircraft and other vehicles.

BACKGROUND

Almost all modern vehicles utilize antennas to provide communication capabilities. The antennas are often mounted to the exterior surface of a vehicle. However, an exterior-mounted antenna may increase the drag on the vehicle. Further, an exterior mounted antenna may be damaged due to lightning, exposure to the elements, and/or through direct impact by materials such as sand, hail, or other objects. This may be especially problematic for high speed vehicles that utilize externally mounted antennas.

A radome is a weatherproof, often structurally load bearing, enclosure for an antenna appendage, constructive of electromagnetically transparent or frequency selective materials, which protects the antenna from the environment and wind loads. On aircraft, aerodynamically designed radomes can protect the antenna from the environment, but impose added weight and wind drag on the vehicle. In addition, aircraft radomes can accumulate a static electric charge during flight caused by the triboelectric effect. This charge, known in the industry as precipitation static (p-static) charge, occurs when an aircraft flies through rain, snow, ice, or dust particles. P-static charge on radomes can increase radio frequency interference, and can also be hazardous to maintainers on the ground who may be shocked when they touch the charged radome or panel. Further, the radome, itself may also be susceptible to physical damage.

As the trend in the aircraft industry is to reduce weight, cost, and complexity, and increase speed and safety, it is desirable to develop multi-purpose structures which blend structural, electromagnetic, and charge abatement technologies to optimize the structure's overall utility. Toward this end, it is desirable to eliminate externally mounted appendages such as antennas and radomes, develop improved ways of embedding antennas into existing structures to reduce parts count and eliminate wind drag, make innovative use of existing materials to reduce weight and damage tolerance, and address p-static charge abatement to reduce interference and enhance safety.

SUMMARY

Modern vehicles often utilize composite panels as construction elements. Composite panels typically include multiple layers of materials that are bonded together, resulting in a strong, yet light weight structure. One example of a composite panel utilizes a low-density core with a skin panel bonded to each side of the core. The core may include a honeycomb structure or some other material, such as open or closed cell foam, and may include other reinforcing structures such as pins, as exemplified by X-Cor® pin pultruded Rohacell® foam. The skin panels may utilize lightweight materials such as carbon-graphite or fiberglass. Composite panels are desirable as construction materials due to their light weight and strength. The embodiments described herein provide for composite panels that include elements that form a Radio Frequency (RF) antenna. The composite panels may be integrated along with other composite panels to form a composite structure for a vehicle. In some cases, the composite panels can function both as elements of an RF antenna and as structural elements of the vehicle. When operating as an RF antenna, the composite panels are inherently conformal with an outside surface of a composite structure.

One embodiment comprises a composite panel that includes a first composite laminate that is transparent to electromagnetic radiation, a second composite laminate, and a core interposed between the first composite laminate and the second composite laminate. The composite panel further includes a plurality of pins that are electrically conductive and extend from within the core through to an exterior surface of the second composite laminate, where the plurality of pins form Radio Frequency (RF) elements of one or more RF antennas and form feed points for the one or more RF antennas.

Another embodiment comprises a composite structure for a vehicle. The composite structure includes a plurality of interconnected composite panels, where at least one of the plurality of interconnected composite panels is comprised of a first composite laminate, a second composite laminate, a core, a first plurality of pins, and a second plurality of pins. The first composite laminate is transparent to electromagnetic radiation. The core is sandwiched between the first composite laminate and the second composite laminate. The first plurality of pins are formed from carbon, extend through the core, and are physically joined to and terminate within the first composite laminate and the second composite laminate. The second plurality of pins are electrically conductive and extend from within the core through to an exterior surface of the second composite laminate. The second plurality of pins form Radio Frequency (RF) elements of one or more RF antennas and form feed points for the one or more RF antennas.

Another embodiment comprises a composite structure for a vehicle. The composite structure includes a plurality of interconnected composite panels, where at least one of the plurality of interconnected composite panels is comprised of a first composite laminate, a second composite laminate, a core, a first plurality of pins, and a second plurality of pins. The first composite laminate is transparent to electromagnetic radiation. The second composite laminate is electrically conductive and configured to electrically couple to an electrical ground. The core is interposed between the first composite laminate and the second composite laminate. The first plurality of pins extend through the core and are physically joined to and terminate within the first composite laminate and the second composite laminate, where the first plurality of pins are resistive and are configured to dissipate an electrostatic charge at the first composite laminate to the electrical ground. The second plurality of pins are electrically conductive and extend from within the core through to an exterior surface of the second composite laminate. The second plurality of pins form Radio Frequency (RF) elements of one or more RF antennas, form feed points for the one or more RF antennas, and are electrically isolated from the second composite laminate.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

FIG. 3 is a side view of the composite panel of FIG. 2 in an illustrative embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
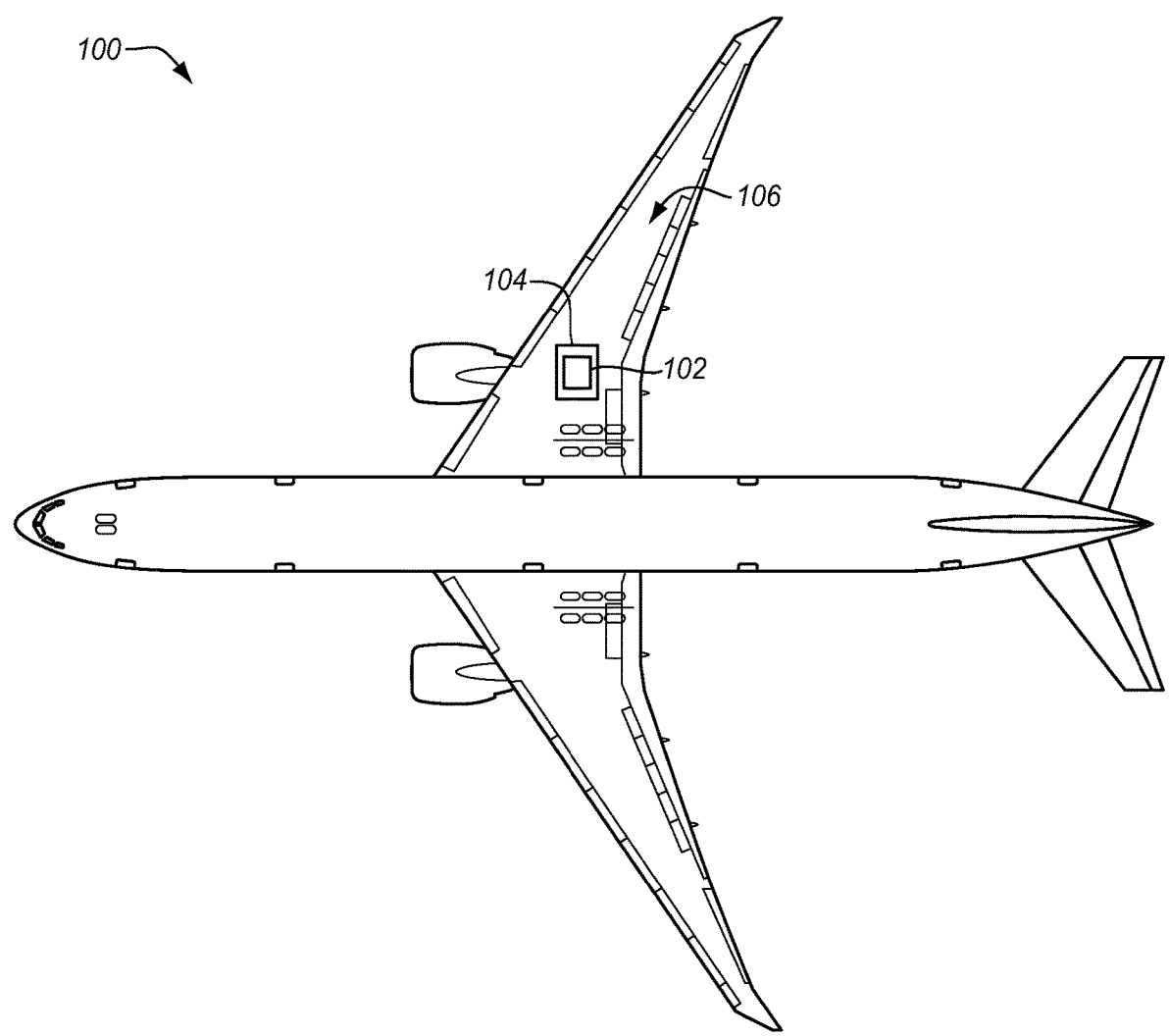
FIG. 1 is top view of a vehicle in an illustrative embodiment.

FIG. 1 is a top view of a vehicle 100 in an illustrative embodiment. Although FIG. 1 illustrates vehicle 100 as a commercial jet aircraft, vehicle 100 may include other types of vehicles in other embodiments. For instance, vehicle 100 may comprise other types of aircraft or spacecraft (e.g., rotorcraft, manned or unmanned fighters, unmanned drone aircraft, etc.), other types of land vehicles (e.g., automobiles, tanks, etc.), and/or other types of underwater vehicles (e.g., submarines, Autonomous Underwater Vehicles (UAVs), etc.).

In FIG. 1, vehicle 100 is illustrated as including an RF antenna 102, which is part of a composite panel 104. Although vehicle 100 is depicted as including one RF antenna 102, vehicle 100 may include any number of RF antennas 102 within one or more composite panels 104 as a matter of design choice. Further, although composite panel 104 and RF antenna 102 are illustrated as part of one of the wings of vehicle 100, the placement of RF antenna 102 and composite panel 104 may include any location on vehicle 100 that utilizes composite panel elements. In particular, an outside surface of composite panel 104 is coincident with an exterior surface 106 of vehicle 100. For example, composite panel 104 may be one of a plurality of composite panels that are interconnected together to form a structural component (e.g., part of a composite structure) for vehicle 100. A structural component is load-bearing. Some examples of structural components for vehicle 100 include wings, stabilizers, a fuselage, a tail boom of a helicopter, etc. Composite panel 104 and RF antenna 102 may be positioned on vehicle 100 to support a variety of communication activities, including air (or ground)-to-air communications, air (or ground)-to-ground communications, air (or ground)-to-space communications, as desired.

Although only one composite panel 104 is illustrated in FIG. 1, vehicle 100 may include any number of composite panels that are interconnected together to form a composite structure or composite assembly. Further, any additional composite panels that are interconnected with composite panel 104 may or may not include RF antenna 102, may or may not include the various materials, properties, and arrangement of any layer(s) described with respect to composite panel 104. For instance, composite panel 104 may be transparent or partially transparent to electromagnetic radiation (e.g., radio frequency or frequencies used by RF antenna 102 to provide communication capabilities to vehicle 100), while other composite panels interconnected with composite panel 104 may be opaque to electromagnetic radiation (e.g., radio frequency or frequencies used by RF antenna 102 to provide communication capabilities to vehicle 100).

Figure 2A:
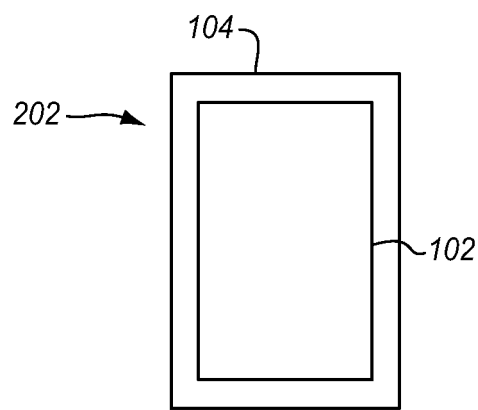
FIGS. 2A and 2B are a top view of a composite panel in an illustrative embodiment.
Figure 2B:
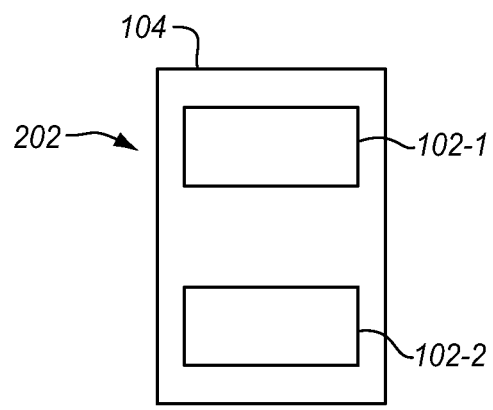

FIG. 2A is a top view of composite panel 104 in an illustrative embodiment. FIG. 2A illustrates that composite panel 104 includes an outside perimeter 202. Outside perimeter 202 of composite panel 104 may be interconnected with any number of additional composite panels to form a composite structure. Although RF antenna 102 in FIG. 2 is illustrated as having a specific size and shape relative to outside perimeter 202 of composite panel 104, the size and shape of RF antenna 102 may vary as a matter of design choice. For instance, RF antenna 102 may be formed from RF elements embedded within composite panel 104 (not shown in this view), which may be present within a portion or subset of a surface area defined by perimeter 202 of composite panel 104. Further, composite panel 104 may include any number of antennas 102 as a matter of design choice. RF antenna 102 may comprise a phased-array antenna in some embodiments. For instance, RF antenna 102 may comprise a plurality of RF elements (not shown in this view), each of which operate as an RF element in a phased-array antenna. FIG. 2B illustrates composite panel 104 that includes a first RF antenna 102-1 and a second RF antenna 102-2. First RF antenna 102-1 and second RF antenna 102-2 may each form comprise different phased-array antennas. For example, first RF antenna 102-1 and second RF antenna 102-2 may operate at different frequencies.

FIG. 3 is a side view of composite panel 104 in an illustrative embodiment. In this embodiment, composite panel 104 includes a first composite laminate 304, a second composite laminate 305, and a core 302 interposed between first composite laminate 304 and second composite laminate 305. In some embodiments, first composite laminate 304 and second composite laminate 305 may be formed from one or more layers of fiber-reinforced polymer plies. First composite laminate 304 and second composite laminate 305 may include one or more sheets or mats of reinforcing fibrous materials bonded together by a polymer matrix material. The polymer matrix material may include any suitable thermoset resin (e.g., epoxy) or thermoplastic. In some embodiments, first composite laminate 304, second composite laminate 305, and core 302 may be consecutively laid up and cured to form composite panel 104. For example, first composite laminate 304 and second composite laminate 305 may include one or more sheets of the reinforcing fibrous material that is pre-impregnated with a polymer matrix material (e.g., a pre-peg), which may be referred to as a dry lay-up. As another example, first composite laminate 304 and second composite laminate 305 may include one or more sheets of the reinforcing fibrous material, and the polymer matrix is applied to the sheet of the reinforcing fibrous material. This may be referred to as a wet lay-up. In addition, the structural, electrical, and/or electromagnetic transmissive properties of first composite laminate 304 and second composite laminate 305 may be defined by the tensile strength, dielectric constant, electromagnetic transparency, and/or the electrical conductivity of the underlying fibrous materials and the polymer matrix material used to form first composite laminate 304 and second composite laminate 305. For instance, the use of a carbon fiber-reinforced polymer ply for second composite laminate 305 may result in second composite laminate 305 being electrically conductive and opaque to electromagnetic radiation (e.g. electromagnetic radiation 312 transmitted and/or received by RF antenna 102). In another example, the use of a glass and/or quartz fiber-reinforced polymer ply for first composite laminate 304 and/or second composite laminate 305 may result in first composite laminate 304 and/or second composite laminate 305 being electrically non-conductive and transparent to electromagnetic radiation (e.g., electromagnetic radiation 312 transmitted and/or received by RF antenna 102).

Core 302 may include any suitable material that is a dielectric and transparent to electromagnetic radiation 312. For example, core 302 may include a honeycomb structure material, a syntactic foam core material, open or closed cell foam, etc. In addition, the structural, electrical, and/or electromagnetic transmissive properties of core 302 may be defined by the tensile strength, dielectric constant, electromagnetic transparency, and/or the electrical conductivity of the underlying materials used to form core 302. For example, core 302 may be formed from a dielectric foam that is transparent to electromagnetic radiation 312.

In this embodiment, first composite laminate 304 and core 302 are transparent to electromagnetic radiation 312. For instance, first composite laminate 304 may comprise glass fiber-reinforced laminates, quartz fiber-reinforced laminates, etc. Generally, first composite laminate 304 and core 302 comprise any material that is transparent to electromagnetic radiation 312, such as the frequency and/or frequency bands that RF antenna 102 operates.

In this embodiment, first composite laminate 304 has an exterior surface 311 that is coincident with exterior surface 106 of vehicle 100. This renders RF antenna 102 formed within composite panel 104 as conformal with respect to exterior surface 106 of vehicle 100, which eliminates the drag experienced by vehicle 100. Due to RF antenna 102 being conformal and protected by composite panel 104, the possibility of damage to RF antenna 102 is greatly reduced.

In this embodiment, composite panel 104 includes a plurality of pins 308, which are electrically conductive. Pins 308 extend from within core 302 through an exterior surface 310 of second composite laminate 305, and form RF elements of RF antenna 102. Further, pins 308 form feed points for RF antenna 102. Although FIG. 3 illustrates a particular orientation, angle, and density of pins 308, other configurations exist. Further, pins 308 may extend fully or partially through core 302 in some embodiments. Pins 308 may be physically joined to first composite laminate 304 and second composite laminate 305 in some embodiments. Pins 308 may comprise carbon fiber pins, which are electrically conductive. Pins 308 may include metal or metallically coated pins in some embodiments.

In some embodiments, a spacing 314 between pins 308 is configured based on the RF design criteria for RF antenna 102. For instance, spacing 314 may depend upon the frequency and/or frequency band that RF antenna 102 is designed to operate. Thus, spacing 314 is one criteria that may be changed in composite panel 104 to adjust the desired or pre-defined RF performance of RF antenna 102.

In other embodiments, a shape of pins 308 is configured based on the RF design criteria for RF antenna 102. For instance, pins 308 may have round shapes, square shapes, tapered shapes, and/or other shapes to achieve a desired RF performance of RF antenna 102. Thus, a shape and/or the different shapes of pins 308 is one criteria that may be changed in composite panel 104 to adjust the desired or pre-defined RF performance of RF antenna 102.

In other embodiments, an angle 316 of pins 308 through second composite laminate 305 and core 302 is configured based on a desired or pre-defined RF performance of RF antenna 102. Angle 316 is generally referenced with respect to a plane 318 of exterior surface 310.

In some embodiments, a thickness 320 of first composite laminate 304, a thickness 322 of core 302, and/or a thickness 324 of second composite laminate 305 is configured based on the desired or pre-defined RF design criteria for RF antenna 102. Thickness 320 and thickness 324 may be used to determine the strength and frequency passband of the composite sandwich, such that strength and frequency performance can be traded off and varied to achieve the desired performance. Thickness 322 may also determine the strength and frequency passband as well as the antenna radiation properties of pins 308. A typical design approach for a given material system would be to set to parametrically vary thicknesses 320, 322, 324 to achieve a balance of desired structural, frequency passband, and antenna radiation properties for a given application.

In some embodiments, second composite laminate 305 comprises one or more layers of carbon fiber-reinforced polymer plies. Carbon fiber is electrically conductive, which allows second composite laminate 305 to operate as a ground plane for RF antenna 102 in some embodiments. When second composite laminate 305 operates as a ground plane for RF antenna 102, pins 308 are electrically isolated from second composite laminate 305. This prevents the RF elements of RF antenna 102 (e.g., pins 308) from being shorted to the ground plane. Pins 308 may be electrically isolated from second composite laminate 305 in a number of different ways, including the use of electrically non-conducting plugs, vias, or other features proximate to regions in second composite laminate 305 where pins 308 traverse through second composite laminate 305.

Figure 4:
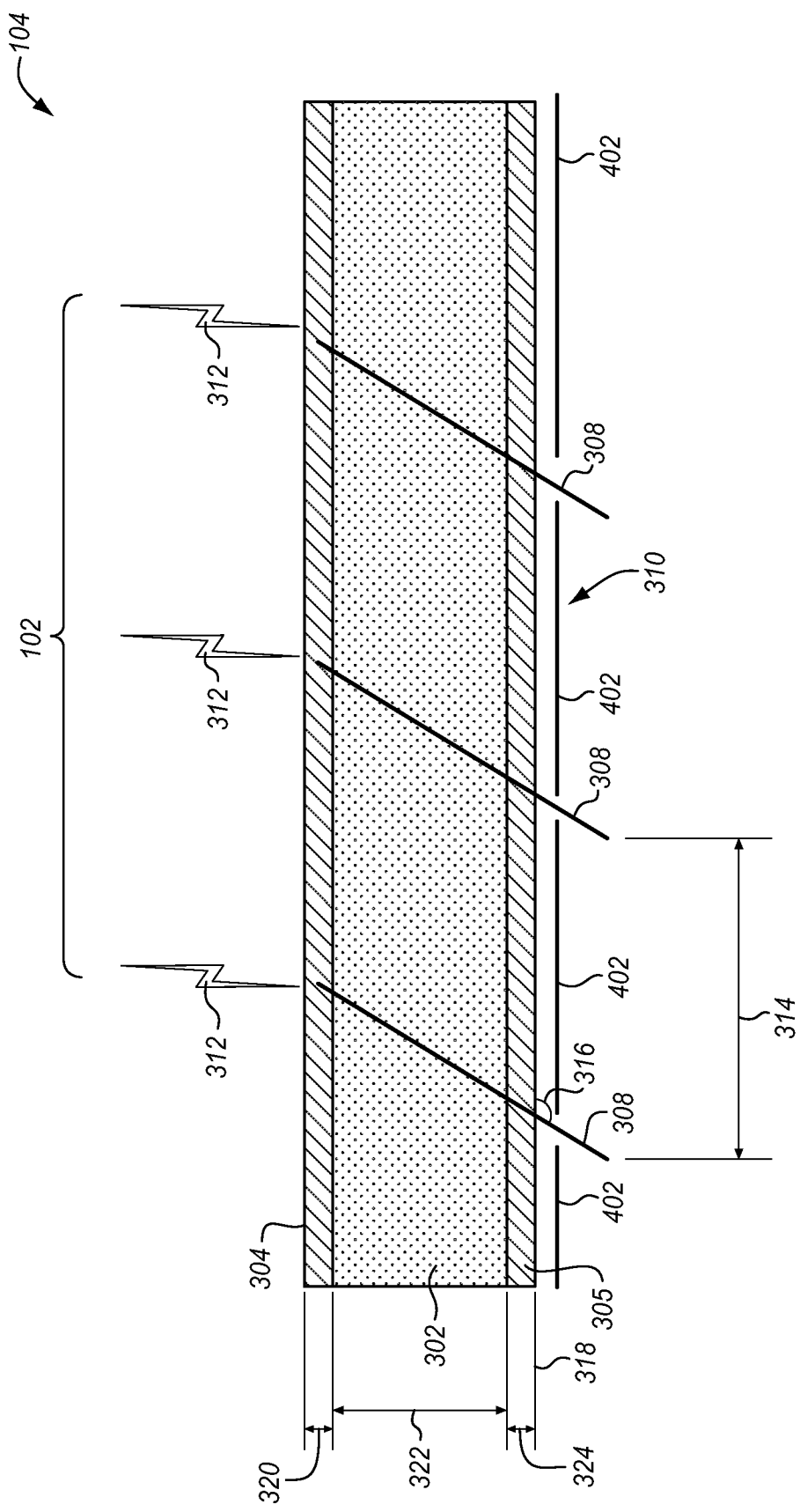
FIG. 4 is a side view of the composite panel of FIG. 2 in another illustrative embodiment.

FIG. 4 is a side view of composite panel 104 in another illustrative embodiment. In this embodiment, composite panel 104 includes a metal film 402 that is proximate to exterior surface 310 of second composite laminate 305. In this embodiment, pins 308 are electrically isolated from metal film 402. Metal film 402 forms a ground plane for RF antenna 102. Further in this embodiment, second composite laminate 305 may be electrically non-conducting. For example, second composite laminate 305 may be formed from one or more layers of glass and/or quartz fiber-reinforced polymer plies. If second composite laminate 305 is electrically non-conducting, then an electrical isolation between pins 308 and second composite laminate 305 may not be needed.

Figure 5:
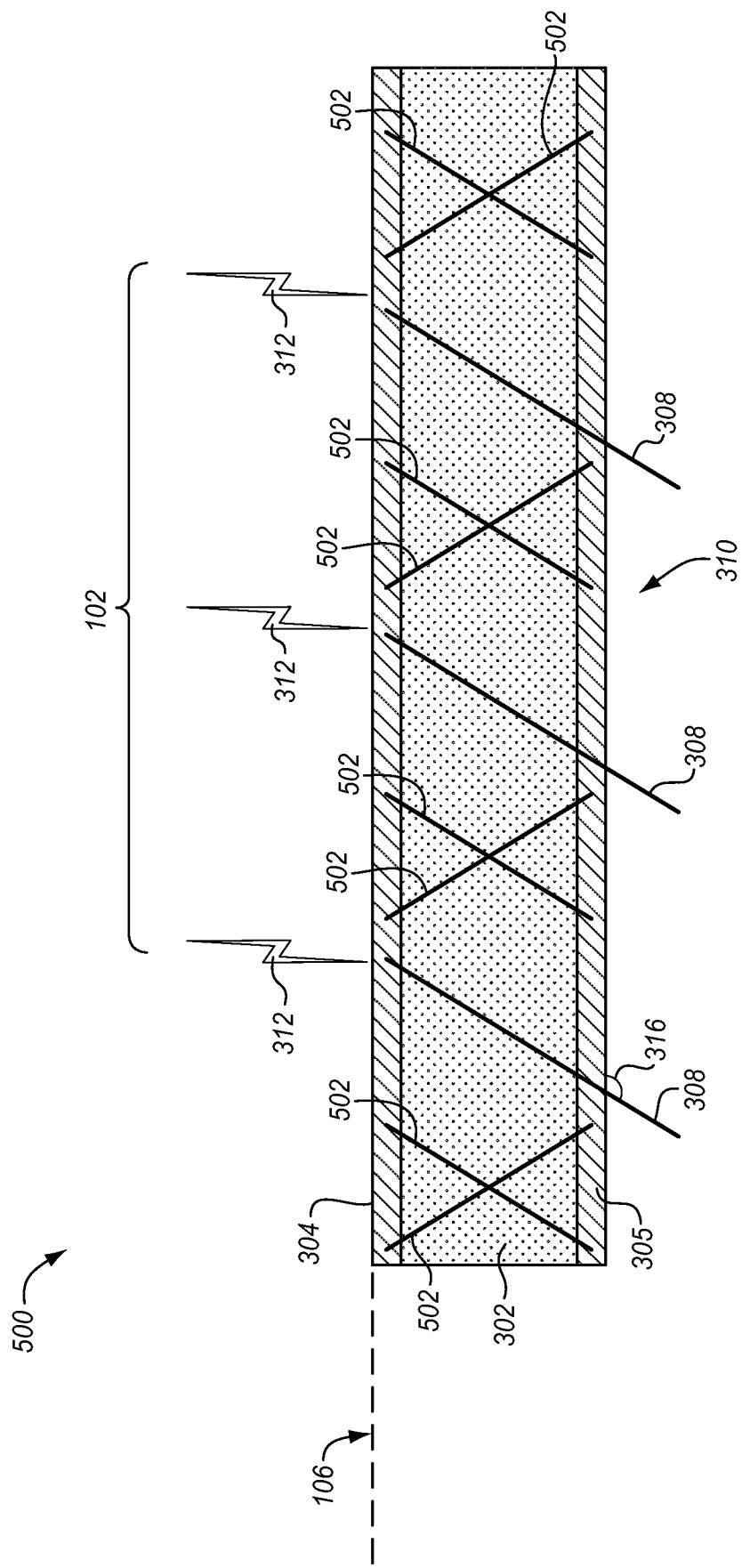
FIG. 5 is a side view of another composite panel in an illustrative embodiment.

FIG. 5 is a side view of another composite panel 500 in an illustrative embodiment. In this embodiment, composite panel 500 includes first composite laminate 304, second composite laminate 305, core 302, and pins 308 as previously described with respect to composite panel 104 of FIG. 3. In this embodiment, composite panel 500 further includes pins 502 which are formed from carbon. Pins 502 extend through core 302 and are physically joined to and terminate within first composite laminate 304 and second composite laminate 305. Pins 502 provide added strength and structural support for composite panel 500 similar to a truss system.

The use of pins 502 in composite panel 500 allows composite panel 500 to be used as a structural component in a composite assembly.

Figure 6:
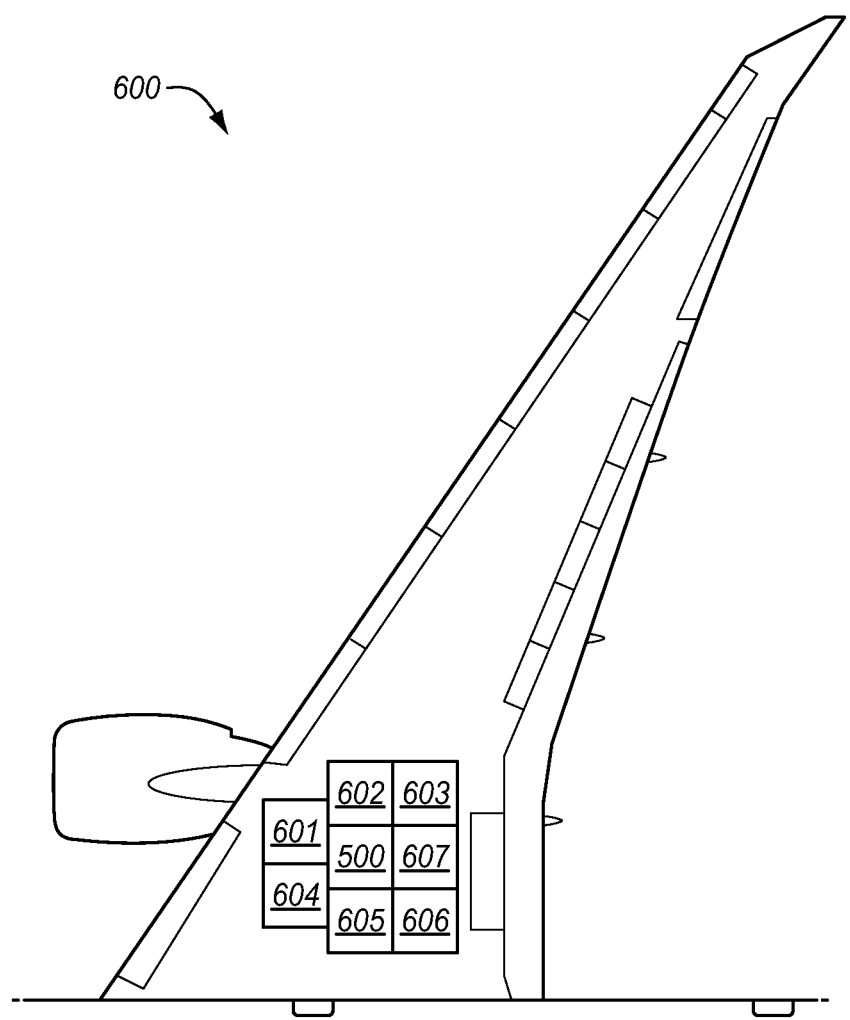
FIG. 6 is a top view of a composite structure in an illustrative embodiment.

FIG. 6 is a top view of a composite structure 600 in an illustrative embodiment. Composite structure 600 in this embodiment includes a plurality of composite panels 601-607 along with composite panel 500 (RF antenna 102 is not shown in this view), each of which are interconnected together. Composite panels 601-607 may include a core interposed between composite laminates, similar to three-layer structure described for composite panel 500. However, composite panels 601-607 may be opaque to electromagnetic radiation 312 used by RF antenna 102. For example, composite panels 601-607 may comprise a foam core or honeycomb core sandwiched between one or more outer layers of carbon fiber-reinforced polymer plies. Although composite structure 600 is illustrated as a wing of an aircraft, composite structure 600 may comprise any structural and/or non-structural component of vehicle 100, including but not limited to a wing, a tail boom of a helicopter, a fuselage, etc.

Figure 7:
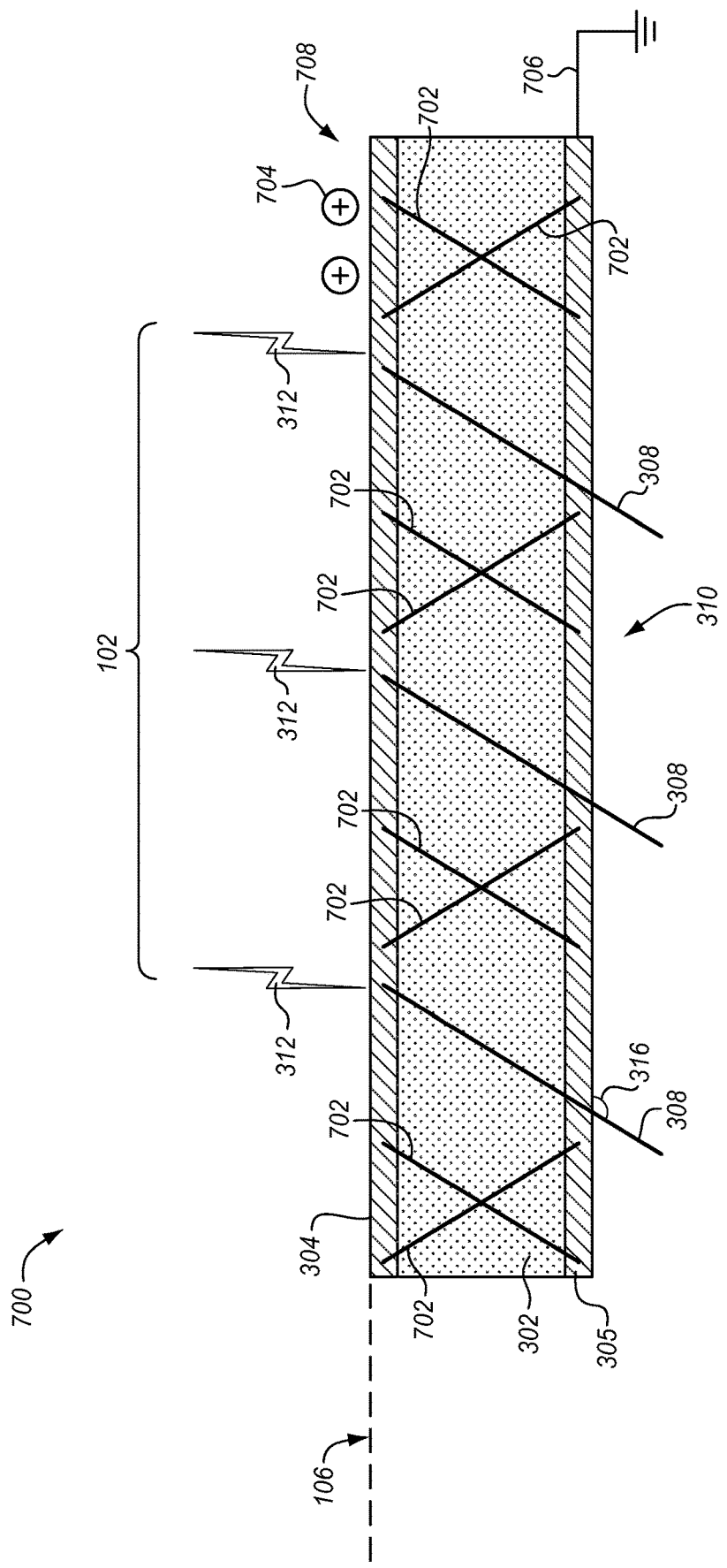
FIG. 7 is a side view of another composite panel in an illustrative embodiment.

FIG. 7 is a side view of another composite panel 700 in an illustrative embodiment. In this embodiment, composite panel 700 includes first composite laminate 304, second composite laminate 305, core 302, and pins 308 as previously described with respect to composite panel 104 of FIG. 3. In this embodiment, second composite laminate 305 is electrically conductive, and pins 308 are electrically isolated from second composite laminate 305. In this embodiment, composite panel 500 further includes pins 702 which are electrically resistive. Pins 702 extend through core 302 and are physically joined to and terminate within first composite laminate 304 and second composite laminate 305. Pins 702 in this embodiment are configured to dissipate an electric charge 704 along first composite laminate 304 to an electrical ground 706. For example, when an aircraft that utilizes composite panel 700 travels through the air, an outside surface 708 of first composite laminate 304 may be electrically charged due to the triboelectric effect while the aircraft flies through rain, snow, ice, or dust, which may pose a shock hazard to personnel that service the aircraft after the flight. In this embodiment, pins 702 form a resistive circuit path for electric charge 704 to electrical ground 706, which removes electric charge 704 from outside surface 708 of first composite laminate 304. This reduces the chances of imposing a shock hazard to the personnel that service air vehicles that utilize composite panel 700. In some embodiments, the resistance of pins 702 is less than the output impedance of pins 308. This ensures that electric charge 704 does not electrically couple to pins 308.

Although specific embodiments were described herein, the scope is not limited to those specific embodiments. Rather, the scope is defined by the following claims and any equivalents thereof.

What is claimed is:

1. A composite panel comprising:
 a first composite laminate that is transparent to electromagnetic radiation;
 a second composite laminate;
 a core interposed between the first composite laminate and the second composite laminate; and
 a plurality of pins that are electrically conductive and extend from within the core through to an exterior surface of the second composite laminate, wherein the plurality of pins form Radio Frequency (RF) elements of one or more RF antennas and form feed points for the one or more RF antennas,
 wherein the plurality of pins have a uniform cross-section.

2. The composite panel of claim 1, wherein:
 a spacing between each of the plurality of pins is defined based on a pre-defined RF performance of the one or more RF antennas.

3. The composite panel of claim 1, wherein:
 a shape of each of the plurality of pins is defined based on a pre-defined RF performance of the one or more RF antennas.

4. The composite panel of claim 1, wherein:
 an angle of each of the plurality of pins through the core and the second composite laminate is defined based on a pre-defined RF performance of the one or more RF antennas.

5. The composite panel of claim 1, wherein:
 a thickness of at least one of the first composite laminate, the second composite laminate, and the core is defined based on a pre-defined RF performance of the one or more RF antennas.

6. The composite panel of claim 1, wherein:
 the second composite laminate comprises a ground plane for the one or more RF antennas; and
 the plurality of pins are electrically isolated from the second composite laminate.

7. The composite panel of claim 1, wherein:
 the one or more RF antennas comprises a phased-array antenna.

8. The composite panel of claim 1, further comprising:
 a metal film that is proximate to the exterior surface of the second composite laminate that comprises a ground plane for the one or more RF antennas,
 wherein the plurality of pins are electrically isolated from the metal film.

9. The composite panel of claim 1, wherein:
 the second composite laminate comprises at least one carbon fiber-reinforced polymer ply.

10. The composite panel of claim 1, wherein:
 the core is formed from a material that is electrically non-conductive and transparent to the electromagnetic radiation.

11. A composite structure for a vehicle, the composite structure comprising:
 a plurality of interconnected composite panels, wherein at least one of the plurality of interconnected composite panels comprises:
  a first composite laminate that is transparent to electromagnetic radiation;
  a second composite laminate;
  a core sandwiched between the first composite laminate and the second composite laminate;
  a first plurality of pins formed from carbon that extend through the core and are physically joined to and terminate within the first composite laminate and the second composite laminate; and
  a second plurality of pins that are electrically conductive and extend from within the core through to an exterior surface of the second composite laminate, wherein the second plurality of pins form Radio Frequency (RF) elements of one or more RF antennas and form feed points for the one or more RF antennas.

12. The composite structure of claim 11, wherein:
 a spacing between each of the second plurality of pins is defined based on a pre-defined RF performance of the one or more RF antennas.

13. The composite structure of claim 11, wherein:
a shape of each of the second plurality of pins is defined based on a pre-defined RF performance of the one or more RF antennas.

14. The composite structure of claim 11, wherein:
an angle of each of the second plurality of pins through the core and the second composite laminate is defined based on a pre-defined RF performance of the one or more RF antennas.

15. The composite structure of claim 11, wherein:
a thickness of at least one of the first composite laminate, the second composite laminate, and the core is defined based on a pre-defined RF performance of the one or more RF antennas.

16. The composite structure of claim 11, wherein:
the second composite laminate comprises a ground plane for the one or more RF antennas; and
the second plurality of pins are electrically isolated from the second composite laminate.

17. The composite structure of claim 11, wherein:
the one or more RF antennas comprises a phased-array antenna.

18. The composite structure of claim 11, further comprising:
a metal film that is proximate to the outside surface of the second composite laminate that comprises a ground plane for the one or more RF antennas,
wherein the second plurality of pins are electrically isolated from the metal film.

19. The composite structure of claim 11, wherein:
the second composite laminate comprises at least one carbon fiber-reinforced polymer ply.

20. The composite structure of claim 11, wherein:
the core is formed from a material that is electrically non-conductive and transparent to the electromagnetic radiation.

21. The composite structure of claim 11, wherein at least one of the plurality of interconnected composite panels is opaque to the electromagnetic radiation.

22. The composite structure of claim 11, wherein:
the composite structure forms a structural component of a vehicle.

23. The composite structure of claim 11, wherein:
the composite structure comprises a wing of an aircraft.

24. A composite panel comprising:
a first composite laminate that is transparent to electromagnetic radiation;
a second composite laminate;
a core interposed between the first composite laminate and the second composite laminate;
a plurality of pins that are electrically conductive and extend from within the core through to an exterior surface of the second composite laminate, wherein the plurality of pins form Radio Frequency (RF) elements of one or more RF antennas and form feed points for the one or more RF antennas; and
a metal film that is proximate to the exterior surface of the second composite laminate that comprises a ground plane for the one or more RF antennas,
wherein the plurality of pins are electrically isolated from the metal film.

* * * * *